(12) United States Patent
Xu

(10) Patent No.: US 10,914,712 B2
(45) Date of Patent: Feb. 9, 2021

(54) SPHERICAL POROUS HYDROXYAPATITE SORBENT AND METHODS THEREOF

(71) Applicant: BIO-RAD LABORATORIES, INC., Hercules, CA (US)

(72) Inventor: James W. Xu, Basking Ridge, NJ (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 182 days.

(21) Appl. No.: 15/123,307

(22) PCT Filed: Mar. 3, 2015

(86) PCT No.: PCT/US2015/018449
§ 371 (c)(1),
(2) Date: Sep. 2, 2016

(87) PCT Pub. No.: WO2015/134469
PCT Pub. Date: Sep. 11, 2015

(65) Prior Publication Data
US 2018/0209947 A1    Jul. 26, 2018

Related U.S. Application Data

(60) Provisional application No. 61/947,128, filed on Mar. 3, 2014.

(51) Int. Cl.
*B01J 20/04* (2006.01)
*B01J 20/282* (2006.01)
(Continued)

(52) U.S. Cl.
CPC .......... *G01N 30/482* (2013.01); *B01J 20/048* (2013.01); *B01J 20/282* (2013.01);
(Continued)

(58) Field of Classification Search
CPC ................................................. B01J 20/048
See application file for complete search history.

(56) References Cited

U.S. PATENT DOCUMENTS 4,301,020 A * 11/1981 Johnson, Jr. ........ C04B 35/2608
106/480
4,330,514 A    5/1982 Nagai et al.
(Continued)

FOREIGN PATENT DOCUMENTS

CN    102574686 A    7/2012
CN    103560246 A    2/2014
(Continued)

OTHER PUBLICATIONS

Yanli, W. et al. "Effect of Particle Size of Raw Material on Hydroxyapatite Synthesis via the Precipitation Method Based on Ca(OH)2—H3PO4 System," Journal of the Chinese Ceramic Society (2008); 36(3): 373-377.
(Continued)

*Primary Examiner* — Ryan B Huang
(74) *Attorney, Agent, or Firm* — Fox Rothschild LLP

(57) ABSTRACT

Highly spherical sorbents of porous hydroxyapatite materials and methods of producing these sorbents are disclosed. The sorbents of the present invention have good mechanical stability and are useful as chromatography media for the separation of biomolecules, such as proteins and nucleic acids.

10 Claims, 8 Drawing Sheets

(51) Int. Cl.
*B01J 20/30* (2006.01)
*B01J 20/28* (2006.01)
*C01B 25/32* (2006.01)
*B01J 20/281* (2006.01)

(52) U.S. Cl.
CPC ... *B01J 20/28004* (2013.01); *B01J 20/28011* (2013.01); *B01J 20/28019* (2013.01); *B01J 20/28071* (2013.01); *B01J 20/28085* (2013.01); *B01J 20/3021* (2013.01); *B01J 20/3028* (2013.01); *B01J 20/3085* (2013.01); *C01B 25/322* (2013.01)

(56) References Cited

U.S. PATENT DOCUMENTS

| | | | |
|---|---|---|---|
| 4,849,193 A | 7/1989 | Palmer et al. | |
| 5,039,408 A | 8/1991 | Ichitsuka et al. | |
| 5,082,566 A * | 1/1992 | Tagaya | C01B 25/32 210/198.2 |
| 5,858,318 A * | 1/1999 | Luo | C01B 25/325 423/308 |
| 7,695,740 B2 * | 4/2010 | Gibson | A61L 24/02 424/423 |
| 2007/0196259 A1 | 8/2007 | Stark et al. | |
| 2008/0116118 A1 * | 5/2008 | Zhu | B01F 3/1221 209/142 |
| 2010/0303702 A1 | 12/2010 | Ogawara | |
| 2012/0285880 A1 * | 11/2012 | Kobayashi | B01J 20/048 210/263 |
| 2017/0014798 A1 | 1/2017 | Kobayashi | |

FOREIGN PATENT DOCUMENTS

| | | |
|---|---|---|
| EP | 0337123 A1 | 10/1989 |
| JP | H04175213 A | 6/1992 |
| JP | H09020508 A | 1/1997 |
| JP | 2007314356 A | 12/2007 |
| JP | 2011068539 A | 4/2011 |

OTHER PUBLICATIONS

Osamu Fujino, et al., The Basic Study on the Synthesis of Hydroxyapatite in Solution, Research Institute for Science and Technology, Nov. 28, 2002, pp. 39-46.

* cited by examiner

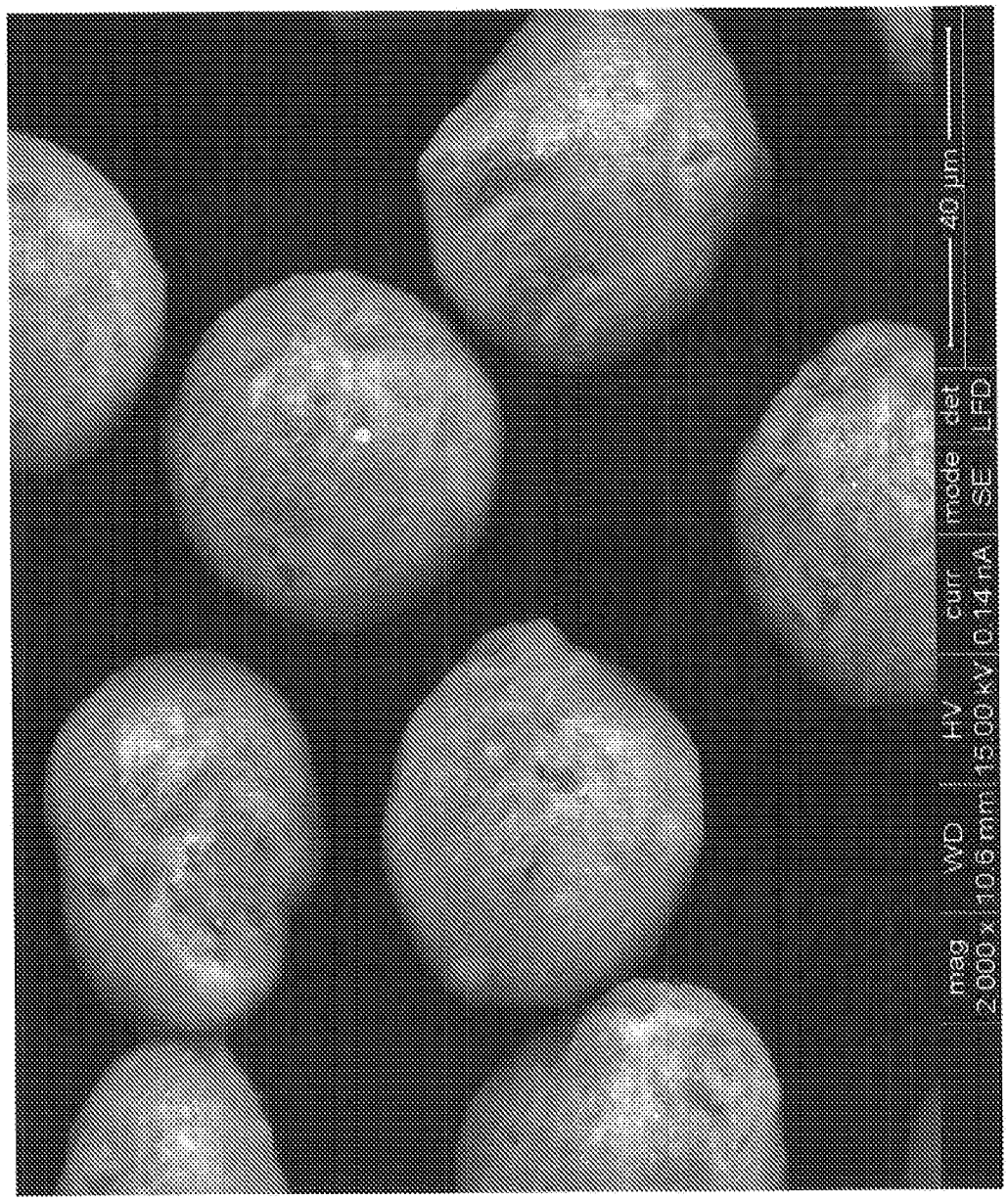

SPHERICAL POROUS HYDROXYAPATITE SORBENT AND METHODS THEREOF

CROSS REFERENCE TO RELATED APPLICATIONS

This application is a U.S. National Phase of International Application No. PCT/US2015/018449, which claims priority under 35 U.S.C. § 119(e) to U.S. Provisional Application No. 61/947,128, filed on Mar. 3, 2014, the disclosures of which are incorporated herein by reference in their entirety.

FIELD OF THE INVENTION

The present invention relates to nanostructured synthetic hydroxyapatite compositions and methods of preparation. The synthetic hydroxyapatite compositions have highly spherical particles and porous structures with excellent mechanical strength and durability under high pressure, and are useful as a chromatographic sorbent.

BACKGROUND OF THE INVENTION

Hydroxyapatite, having a formula of $Ca_{10}(PO_4)_6 \cdot (OH)_2$, is an inorganic ingredient of bone and teeth. As a nontoxic and biocompatible material, it is generally used as a packing material to be filled in columns for chromatographic separation of biomolecules, for example, proteins, enzymes, vaccines and nucleic acids. Its ability to adsorb these biomolecules depends on both the structures of chromatography sorbent particles and the concentration of active sites on the exposed surfaces.

A method for preparation of hydroxyapatite usable for column chromatography was first developed by Tiselius et al. [Arch. Biochem. Biophys., 65:132-155 (1956)]. Hydroxyapatite packed in columns for chromatographic use has been prepared by various methods. Conventionally, crystalline hydroxyapatite is synthesized by wet synthesis in which a water-soluble calcium salt and a phosphate are allowed to react in an aqueous solution. Then, the hydroxyapatite formed is granulated to obtain micro-particles. The hydroxyapatite produced by conventional processes has the following disadvantages: 1) irregularity in particle shape and size, 2) low mechanical strength, and 3) a low level of active sites on the crystal surface after heat treatment. Due to the irregularities in particle shape and size, the hydroxyapatite particles cannot be packed uniformly or densely in the column for chromatographic separation. Due to its low mechanical strength, the hydroxyapatite packed into a column bed tends to be destroyed during the use for purification, finally leading to the bed collapse. Thus, the use of hydroxyapatite for chromatographic separation is dramatically limited.

Many efforts have been made in the past twenty years to produce ideal sorbent for chromatographic use without much success. Hydroxyapatite, a ceramic material, is hard but mechanically fragile. In order to improve its mechanical strength, hydroxyapatite is usually treated at high temperatures. As a compromised result, the surface active sites, which are proportional to the capacity of hydroxyapatite sorbent to bind biomolecules, are greatly reduced. Due to its chemical and structural properties, hydroxyapatite sorbent meeting all fundamental requirements is difficult to prepare.

Not only do the conventional processes for the preparation of spherical hydroxyapatite sorbent have various issues, but use of the sorbent prepared as a packing material for chromatographic purification is also problematic.

Therefore, new processes are needed to produce porous hydroxyapatite sorbents that provide desirable separation capabilities, yet retain their shape, binding capacity, and chemical and mechanical properties during the use for chromatographic separation. In addition, hydroxyapatite sorbent should have pore sizes sufficient to allow fast mass transfer of large biomolecules. Finally, the manufacturing process from batch to batch should be reproducible to ensure chromatographic performance and physical characteristics of the hydroxyapatite sorbents. Hydroxyapatite materials having excellent mechanical strength and chromatographic characteristics as described above have not been reported.

SUMMARY OF THE INVENTION

The present invention provides a new type of hydroxyapatite compositions useful as chromatography sorbents, among others, and methods of preparing the new hydroxyapatite compositions.

In one aspect, the present invention provides a hydroxyapatite composition comprising hydroxyapatite particles, wherein bulk density of the hydroxyapatite particles is about 0.5 to 0.9 $g/cm^3$, and wherein the hydroxyapatite particles further comprise consolidated secondary particles having spherical shape and porous structures.

In one embodiment, in the hydroxyapatite composition of the present invention, the average pore size of the consolidated secondary particles is about 50 to 100 nm, and the average pore volume of the consolidated secondary particles is about 0.1-0.5 $cm^3/g$.

In another embodiment, in the hydroxyapatite composition of the present invention, the hydroxyapatite particles have a median particle size of 20±4 μm, 40±4 μm, 60±4 μm, or 80±4 μm.

In another embodiment, in the hydroxyapatite composition of the present invention, the sphericity of each of the hydroxyapatite particles is at least 0.95, preferably at least 0.97, and more preferably at least 0.99.

In another aspect, the present invention provides a method of producing a hydroxyapatite composition, comprising the following steps:

(a) reacting an aqueous suspension comprising calcium hydroxide powder with an aqueous solution comprising phosphoric acid and a phosphate salt to obtain a hydroxyapatite suspension comprising primary particles of hydroxyapatite;

(b) milling the primary particles of hydroxyapatite in the suspension;

(c) spray-drying the suspension to obtain consolidated secondary particles of hydroxyapatite; and (d) sintering the consolidated secondary particles to obtain sintered hydroxyapatite particles.

In one embodiment, the method of the present invention further comprises a step of (e) classifying the sintered hydroxyapatite particles to obtain hydroxyapatite particles having a desired particle size range and/or desired median particle size.

In some embodiments, the method further comprises addition of a dispersant into the suspension to obtain a homogenized suspension before the spray-drying step.

In some embodiments of the present invention, the phosphate salt in reaction step (a) comprises a calcium phosphate-based compound.

In another embodiment, the hydroxyapatite suspension formed in the method of the present invention has a pH in the range of about 7 to 12, preferably 8 to 11.

In some embodiments of the present invention, the dispersant is selected from inorganic compounds, short-chain organic compounds, polymers, and combinations thereof.

In some embodiments of the present invention, as a dispersant, the inorganic compound is selected from the group consisting of phosphates, silicates, and carbonates; the short-chain organic compound is selected from the group consisting of organic electrolytes and surfactants; and the polymer is selected from the group consisting of polymer electrolytes and polymer nonelectrolytes.

In the method of the present invention, said milling in step (b) can be any suitable milling technique known to a person skilled in the art, including but not limited to ball milling.

In some embodiments of the present invention, the mean particle size of the hydroxyapatite particles obtained from the milling step (b) is in the range of about 1.0 to 5.0 μm.

In some embodiments of the present invention, the temperature used for said sintering is in the range of about 450 to 800° C., preferably about 550 to 750° C., and more preferably about 650° C.

In some embodiments of the present invention, classification of resultant hydroxyapatite particles can be done by any suitable sifting technique known to a person skilled in the art, including but not limited to ultrasonic sifting.

In another aspect, the present invention encompasses a hydroxyapatite composition prepared by a method according to any embodiments disclosed herein.

In another aspect, the present invention encompasses a hydroxyapatite composition, essentially as shown and described, for example, in the Examples and as characterized by the Figures.

In another aspect, the present invention provides use of the hydroxyapatite composition according to any embodiments disclosed herein as a chromatography sorbent.

In another aspect, the present invention provides a chromatography sorbent, comprising a hydroxyapatite composition according to any embodiments disclosed herein.

In another aspect, the present invention provides an article of manufacture comprising a hydroxyapatite composition according to any embodiments disclosed herein.

In another aspect, the present invention provides a device or apparatus comprising a chromatographic sorbent according to any embodiments disclosed herein.

In another aspect, the present invention provides a method of analysis or separation of organic and/or biological samples using a chromatography device or apparatus comprising a chromatographic sorbent according to any embodiments disclosed herein.

Other objects, advantages, and novel features will be readily apparent to those skilled in the art from the following drawings and detailed description of the invention.

BRIEF DESCRIPTION OF THE DRAWINGS

The components in the figures are not necessarily to scale, but the emphasis is instead placed upon illustrating the principles of exemplary embodiments of the present invention, while reference numerals designate corresponding parts through different views.

DETAILED DESCRIPTION OF THE INVENTION

Figure 1:
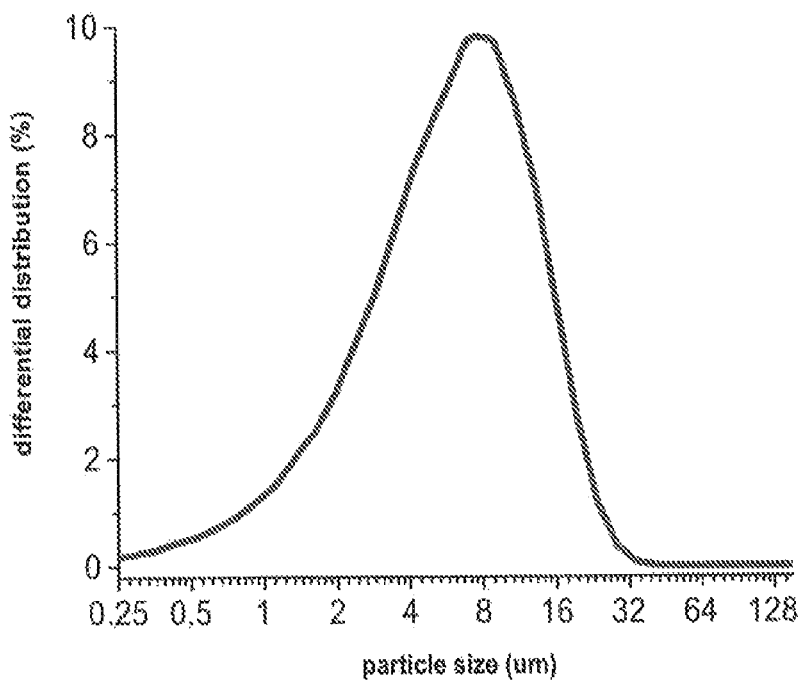
FIG. 1 shows particle size distribution curves of hydroxyapatite primary particles in the resultant suspension obtained in Example 1.

The present invention aims to provide a sorbent with mechanical stability, and capable of exhibiting excellent performance in chromatographic separation when used as an adsorbent to be packed into a column. Furthermore, the present invention also aims to provide a reliable method that can produce the sorbent in large scale to meet the demand for industrial applications.

In one aspect of the present invention, a chromatographic sorbent having the chemical composition of hydroxyapatite is provided, which combines the separation capabilities of crystals with the strength of its own framework as support.

The chromatographic medium of the present invention shows superior properties in substance separation when used as adsorbent packed or charged into a column. In particular, for substances having a small difference in structure from one another or chemically identical, such as monomers and aggregates, good selectivity and high precision separation can be achieved by the chromatography using the medium of the present invention as the adsorbent. In addition, the medium of the present invention can be chosen for those high purity separations that are otherwise difficult to achieve with the use of existing adsorbents. Substances that can be separated by the medium of the present invention include biomolecules such as proteins, including immunoglobulin or enzyme, nucleic acids, such as RNA and DNA, and vaccines. In some applications, the medium of the present invention used at the final polishing step in downstream bioprocesses is indispensable for obtaining useful drug substances of high purity.

In one embodiment, the chromatographic medium of the present invention is comprised of micro-sized hydroxyapatite beads, characterized by nanostructured network, high mean pore diameter, good sphericity and narrow distribution in bead size, good binding capacity, and enduring mechanical stability. Moreover, compared with the conventional adsorbent, the hydroxyapatite sorbent of the present invention has a high bulk density and much less small beads that facilitate the packing of fixed-bed column with reproducible column separation performance. Also owing to its high mechanical strength, the running cycles for chromatographic separation are increased accordingly when packed in the column of large bed volume (for example >50 L), and thus the operational cost is greatly reduced for industrial production.

In one aspect, the present invention provides a method for the synthesis of nanostructured hydroxyapatite crystal, which is used as precursor for producing chromatographic sorbent. Due to its network structure composed of nanorods, the hydroxyapatite synthesized has high surface areas, ensuring good binding capacity for biomolecules when adsorbed on the surface of crystals. The raw materials are mainly inorganic, which are inexpensive and commercially available. The reaction conditions are mild and easy to control without need to use a specific type of equipment. Meanwhile, the by-products produced are nontoxic and environmentally friendly.

In one embodiment, to produce the hydroxyapatite nanocrystals, the method of the present invention comprises adding a solution containing two raw materials, i.e., ammonium phosphate monobasic and phosphoric acid, into a suspension containing a solid raw material calcium hydroxide with vigorous stirring. The resultant suspension with the content of hydroxyapatite nanocrystals is then obtained. In one embodiment, the optimum pH value of the resultant suspension is in the range of about 8 to about 11.

In order to increase the bulk density and obtain the appropriate pore size of final consolidated product, in one embodiment, the hydroxyapatite primary particles in the above resultant suspension are milled into smaller particles. In one embodiment, a ball-mill method is applied by continuously pumping the suspension containing hydroxyapatite particles into a closed cylinder filled with zirconia beads. In one embodiment, the median size of the milled particles is about 1 µm (D50) or higher, preferably in the range of about 1 to 5 µm, more preferably in the range of about 1 to 3 µm. By controlling the median size of milled particles within these ranges, the method of the present invention can reliably produce final hydroxyapatite sorbent comprising consolidated secondary particles having a bulk density of in the range of about 0.5 to 0.9 g/cm$^3$, in particular 0.55 to 0.82 g/cm$^3$.

In another embodiment, the present invention provides a method for making highly spherical porous hydroxyapatite microspheres composed of consolidated secondary particles. Specifically, in one embodiment, before spray drying, an appropriate amount of dispersant is added into the above milled suspension to lower the viscosity of suspension and thus greatly improve the liquid flowability. Then, the consolidated hydroxyapatite secondary particles are obtained by spray drying the droplets containing the hydroxyapatite primary particles inside a heated vertical chamber. As a result, the sphericity of the consolidated hydroxyapatite secondary particles thus obtained is greatly improved when compared with the product obtained without use of any dispersant.

The dispersants used to improve the flowability of suspension include, but are not limited to, inorganic compounds, short chain organic compounds and polymers.

In another embodiment, the present invention provides a method of treating the hydroxyapatite powders obtained by spray drying at a high temperature and further classifying the powders to obtain various final sorbent products with different mean particle sizes. In one embodiment, the treatment temperature is adjusted to ensure their mechanical stability, good binding capability and pore openings big enough for overcoming the potential hindrance of mass transfer of biomolecules to the final sorbents. Preferably, an ultrasonic sifting method is applied for the classification of particles of a wide distribution of particle size. As a result, the final sorbent products obtained have narrow particle size distributions.

The sorbent of the present invention is produced by spray drying the ball-milled synthesized hydroxyapatite ($Ca_{10}(PO_4)_6(OH)_2$) primary particles, followed by high temperature treatment and particle classification. While not intended to be limiting, the sorbent obtained according to the present invention has a narrow distribution of particle size and a bulk density in the range of about 0.5 to 0.9 g/cm$^3$, typically about 0.55-0.82 g/cm$^3$ and a pore volume of about 0.1-0.5 cm$^3$/g. The sorbent is chemically and mechanically stable, especially useful in packed bed, fluidized bed or stirred batch adsorption, or chromatographic separation and purification of biomolecules.

The highly spherical sorbent that can be obtained using the method of the present invention includes not only hydroxyapatite but also other types of synthetic materials. The synthetic materials include organic materials and inorganic materials, and the inorganic materials are preferably ceramic materials, such as calcium phosphate-based ceramics, mineral oxides, and the like. Among them, hydroxyapatite is nontoxic and biocompatible. Therefore, hydroxyapatite is an ideal biomaterial for biomedical applications, such as artificial bone and tooth, matrix for drug delivery system, and the like. Furthermore, as a ceramic material with functional groups on the crystal surfaces, hydroxyapatite not only has superior adsorption capability to various biomolecules, but also can serve as a support material as chromatographic medium.

Herein below, a sorbent, and a method of producing the sorbent according to the present invention will be described in more detail with reference to certain preferred embodiments.

1. Synthesis of Nanostructured Hydroxyapatite Precursors

First, nanostructured hydroxyapatite, which is used as a precursor for producing spherical particles, is synthesized by a reaction of mixing a solution with a suspension. The solution contains a mixture of two raw materials and the suspension contains one raw material. During the reaction, the suspension is vigorously stirred and a circulating bath is set at a temperature to maintain the reaction temperature inside the vessel. At the end of reaction, the primary hydroxyapatite particles with nanorod structure are obtained.

In one embodiment, to produce the hydroxyapatite precursor, a solution containing two raw materials, i.e., ammonium phosphate monobasic and phosphoric acid, dissolved in water, is slowly added into a suspension containing a solid raw material calcium hydroxide in water while vigorously stirring. In one embodiment, the stoichiometric ratio of Ca/P for the raw materials used is 1.67.

According to the method described above, it is possible to obtain hydroxyapatite particles with nanorod network structure and high surface area, which is highly desirable for the use as a chromatographic medium.

Based on the need of industrial applications, the batch size of manufacturing hydroxyapatite is up-scalable without any impact on the physicochemical properties of hydroxyapatite. Preferably the size of reaction vessel is from 10 L to 10,000 L, more preferably 50 L to 5,000 L.

In one embodiment, the initial temperature of the suspension in the reaction vessel may be set between 20 to 50° C., and preferably the circulating bath temperature is maintained at the initial temperature during the course of reaction. In another preferable embodiment, the initial temperature is set at 35° C., as shown in Example 1. When the bath circulation temperature is held at 35° C., the variation of reaction temperature during the course of reaction caused mainly by the exothermic neutralization between the raw materials may be minimized. In some embodiments, in order to avoid the temperature excursion, the addition rate of the solution should be controlled during the mixing of the solution containing ammonium phosphate monobasic and phosphoric acid with calcium hydroxide suspension in the reactor. In some preferred embodiments, the excursion temperature is controlled within about 5° C. of the initial reaction temperature, which is important to ensure reproducible manufacturing from batch to batch so as to obtain consistent properties of hydroxyapatite nanocrystals in this synthesis step. In some embodiments, the addition time of the solution containing ammonium phosphate monobasic and phosphoric acid is from about 10 to about 24 hours, preferably about 16 hours. After the completion of solution addition, the mixture is continuously stirred for additional about 1 to 5 hours, preferably about 2 hours, while maintaining the temperature the same as initial temperature, ensuring that the reaction goes to completion.

The pH of the resultant suspension at the end of reaction is critical. In some embodiments, the pH of the resultant suspension should be in the range of about 7 to 12, preferably 8 to 11. When pH is below 7, hydroxyapatite tends to further change into dicalcium phosphate (DCP), tricalcium phosphate (TCP), or the like. When only phosphoric acid is used to react with calcium hydroxide, due to the lack of buffering capacity in the reaction system, the pH will change dramatically when approaching the end of reaction, which potentially produces some by-products such as DCP and TCP. The formation of DCP and TCP is not desirable in producing high purity hydroxyapatite nanocrystals. In particular, when the amount of phosphoric acid used is a little more than the stoichiometric amount by calculation, the pH could be much lower than 7 and a large amount of by-products including DCP and TCP would be produced.

To overcome the above shortcoming, in some embodiments the present invention also uses ammonium phosphate monobasic as one of the raw materials to provide the phosphate source together with phosphoric acid. One advantage for the use of ammonium phosphate monobasic is that when the reaction is approaching the end, the reaction occurs in a system with buffering capability so that the potential dramatic change in pH can be avoided. Another advantage is that ammonium phosphate monobasic as a raw material enables the reaction to occur in a more moderate and controllable way, introducing less temperature excursion of the reaction system. Unlike the exothermic neutralization reaction between calcium hydroxide and phosphoric acid, which is more drastic, the reaction of ammonium phosphate monobasic with calcium hydroxide produces less heat and thus is more tepid. These conditions are helpful to producing hydroxyapatite having consistent material properties.

The amount of solid calcium hydroxide suspended in water and the amount of phosphoric acid and ammonium phosphate monobasic dissolved in water may vary as long as the suspension in the reactor could be easily stirred without substantial hindrance during the course of reaction. Specifically, in an embodiment, the ratio of calcium hydroxide:water is 1:10 (weight/weight). In another embodiment, the ratio of phosphoric acid (85% w/w):ammonium phosphate monobasic:water is 17:1:50 (weight/weight/weight). According to the present invention, the relative amount of phosphoric acid and ammonium phosphate monobasic can vary as long as the stoichiometric ratio of Ca/P is about 1.67.

2. Preparation of Fine Hydroxyapatite Particles by Ball Mill Method

If the above synthesized primary particles are directly spray dried, followed by sintering the consolidated secondary particles, the sorbent obtained is very loose and has a low bulk density. As a result, the mechanical strength is low. When packed in the column bed, the sorbent tends to collapse under pressure. In order to increase bulk density and mechanical stability of the sorbent, it is necessary to mill the hydroxyapatite primary particles contained in the above resultant suspension into smaller particles so as to obtain tight consolidated secondary particles.

In one embodiment, the present invention provides a method of preparing fine hydroxyapatite particles by ball mill method. Compared with other methods, such as jet mill method, the ball mill method is cost efficient, easy for operation and maintenance, and suitable for large-scale production of a suspension sample. Meanwhile, the particle size obtained meets the requirements of process in the following steps. Briefly, the ball mill method is applied by continuously feeding the hydroxyapatite suspension into a closed cylinder chamber filled with spherical zirconia beads and mechanically rotating the beads.

In one embodiment, the procedure of a ball-mill method is detailed as follows. The hydroxyapatite suspension is pumped, e.g., by a mechanical means, into a closed cylinder chamber filled with zirconia beads, which have a mean bead size of, e.g., about 0.8 mm. The primary particles are milled into smaller particles inside the chamber when both zirconia beads and suspension are mechanically rotated quickly under high pressure. The milled suspension is continuously eluted out from an opening at the end of cylinder and is collected in a container. Because a lot of heat is produced during the course of operation inside the chamber, a cold water circulation surrounding the cylinder chamber is applied to remove the heat, thus avoiding the potential damage of equipment. To obtain the targeted size of crushed particles, the running cycles of the operation may be adjusted accordingly.

In this regard, the method could reliably crush the primary particles, and thus the final product (hydroxyapatite sorbent) will be reliably obtained by the further manufacturing process.

In some embodiments, the median particle size of the crushed particles obtained is 1 μm or more, preferably 1 to 5 μm, and more preferably 1 to 3 μm. The pore size of the final product is directly related to the sizes of crushed particles, which determine the empty space between the particles of consolidated secondary particles obtained from the step of spray-drying process. When the median particle size of the crushed particles is in these ranges, it is possible to reliably produce the powder of chromatographic sorbent with appropriate bulk density, sufficient mechanical stability, and enough pore size for the binding of biomolecules.

3. Production of Consolidated Hydroxyapatite Secondary Particles

It is desirable to form highly spherical sorbents with good mechanical strength. Due to low sphericity, the existing sorbents do not have both good mechanical stability and large surface pore opening for efficient binding of biomolecules of high molecular weight. To reach this object for obtaining consolidated secondary particles of good sphericity, it is necessary to improve the manufacturing process. Thus, in one aspect the present invention provides a method of making spherical particles by a modified spray-drying method.

In one embodiment, the present invention provides a procedure by addition of a dispersant in the milled hydroxyapatite suspension before the spray-drying method is applied. In one embodiment, an appropriate amount of dispersant added is necessary to improve the spherical shape of powder particles. As a result, the sphericity of consolidated hydroxyapatite secondary particles is higher than the product obtained without use of a dispersant. In some embodiments, the amount of dispersant(s) used should be tightly controlled, because too much or too little dispersant added in the milled suspension could deteriorate the shape of consolidated particles obtained.

Specifically, in one embodiment a calculated amount of dispersant is added slowly into the above milled suspension in a vessel while vigorously stirring under ambient conditions. As a result, the suspension becomes less dense and its viscosity is lowered. Thus, the flowability of the suspension is also greatly improved, which helps the formation of a smooth film on the top of revolving disk in the step of spray-drying. Furthermore, the use of dispersant also reduces the surface tension of droplets formed by the breakdown of the film on the revolving disk when rotated at a high speed. All above advantageous factors provide a reliable method of making consolidated secondary particles with high sphericity obtained by spray-drying process.

The amount of dispersant used is calculated and expressed in percentage of the ratio of dispersant (weight):suspension (weight) (% w/w). Depending on the type of dispersant and the solid content of hydroxyapatite in the milled suspension, the amount of dispersant used can be in the range of, but is not limited to, about 0.005% to 1% (w/w), preferably in the range of 0.01% to 0.2% (w/w). In some embodiments, the use of appropriate amount of dispersant is critical to obtain the consolidated secondary particles with good product quality and performance. In this regard, addition of an insufficient amount of dispersant may not reduce the viscosity of suspension sufficiently. Meanwhile, addition of too much dispersant could lead to the re-aggregation of dispersed particles. As a result, an inhomogeneous suspension is formed and tends to precipitate out, which is not desirable.

The dispersants useful for the present invention include, but are not limited to, inorganic compounds, short chain organic compounds, polymers, and the like.

Examples of inorganic compound dispersants include, but are not limited to, phosphates (such as sodium hexametaphosphate), silicates and carbonates. Examples of short-chain organic compounds include, but are not limited to, organic electrolytes (such as citrate) and surfactants (such as tween 20, tween 80, sodium dodecyl sulfate (SDS) and CTAB). Examples of polymer dispersants include, but are not limited to, polymer electrolytes (such as polyacrylate) and polymer nonelectrolytes (such as polyacrylic acid and PVA).

In one example, 7 g of sodium polyacrylate was added slowly, e.g., dropwise, into 35 L of the milled hydroxyapatite (about 10% w/w) suspension while stirring. The suspension became less viscous and more homogeneous. Even without stirring, the resultant suspension was stable for several hours without any precipitation of hydroxyapatite particles.

The next step is to make spherical secondary particles by spray drying the above well dispersed suspension. Specifically, the above suspension is injected into a vertical drying chamber through an atomization device, such as a revolving disk, a spray nozzle, together with a hot gas stream, e.g., air or nitrogen. The hot gas stream causes rapid evaporation of water from the micro droplets, which are formed by the revolving disk, and release from the spray nozzle. The gas is typically injected at 140 to 220° C. and exits the dryer at a temperature slightly above 100° C. The fine particles of hydroxyapatite formed from the micro droplets are consolidated into individual aggregates of highly spherical shape. The resultant hydroxyapatite microsphere powder, collected at the bottom of spray-drying machine, is comprised of particles in the range from about 10 to 90 µm of particle size, with a majority amount of particles at around 40 µm of particle size.

4. High Temperature Treatment and Classification

Hydroxyapatite is known to be a fragile ceramic material. In order to improve its mechanical strength, the hydroxyapatite needs to be heated at an elevated temperature for a period of time. When the dried hydroxyapatite powder obtained from the above step is treated at a high temperature, the rod-spherical primary particles shrink and tend to interweave together and form a tighter network structure. As a result, the surface pore opening size of the resultant hydroxyapatite sorbent is increased and the mechanical strength of the microsphere powder is enhanced accordingly. The increase of the pore opening size corresponds with the increase of the sintering temperature. Also, at a sintering temperature above 600° C., the pore size may increase until it reaches a maximum with the sintering time. Apparently, the surface area of the sintered powder decreases with the increase of the sintering temperature. The surface area of the hydroxyapatite sorbent, which is directly related to the surface active sites, determines its binding capacity of biomolecules. Depending on the application of hydroxyapatite sorbent for chromatographic separation, a person skilled in the art would be able to optimize the process parameters, such as sintering temperature and time, for desired performance. In one embodiment, when the organic dispersant is used, the sintering is carried out in the presence of an air flow so as to burn out the organic dispersant.

In one embodiment, the powder is placed in an oven exposed to air flow. The powder is gradually heated to 650° C. and maintained at 650° C. for 4 hours. The powder is then cooled down and removed from the oven. Although heating and cooling resulted in the volume variation of crystalline particles, the sorbent beads do not show any crack after these processes. The above operation results in the formation of stable beads with enlarged pore sizes.

The above powder obtained by the high temperature treatment has a wide range of particle size distributions. As chromatographic separation medium, in particular when used for industrial purification process, sorbents of more uniform particle sizes may be preferable. Therefore, in some embodiments, it is necessary to classify the above-obtained powder to obtain the sorbents with narrower particle size distributions.

Various classification methods, including screen sifting and cyclone classification, may be used in the present invention. The cyclone classification method is unable to completely eliminate all unwanted smaller and larger particles. However, for ultrasonic sifting method, the particle size cut-off is determined by the opening size of screens, which are easily custom-designed commercially. Thus, the ultrasonic sifting method is more reliable for obtaining particles with a specifically desired narrow particle size distribution.

In one embodiment, the present invention provides a method of classifying hydroxyapatite particles by use of an ultrasonic vibrating sifter. This method is reliable with good manufacturing reproducibility, and provides final sorbent products with consistent performance. Since the sintered powder is mechanically strong, the integrity of consolidated secondary particles is well maintained when the classification is performed at this stage. For secondary particles obtained by spray-drying, their mechanical stability is weaker than the sintered powder. When the classification process, in particular, the process using the method of cyclone classification, is applied to the dried powder prior to sintering process, some particles tend to break down, which potentially leads to the formation of defects on the classified particles and affects the particle integrity. Therefore, the present invention also provides an ultrasonic sifting method to classify the sintered powder instead of applying such a process to the powder without sintering.

Specifically, for obtaining hydroxyapatite sorbent having a particle size of 40 µm, an ultrasonic vibrating sifter is installed with two screens having opening sizes of 35 µm and 45 µm, respectively. To maximize the separation effectiveness and avoid particle size attrition, the screens are equipped with an ultrasonic system, which is particularly useful for the powder with density of less than 1 g/cm$^3$, for example, the hydroxyapatite powder in the present invention. Briefly, some sintered powder is placed on the top of a 45 µm screen. After a period time of sifting operation, the powder between two screens, i.e., below the 45 µm screen and on the top of the 35 µm screen, is collected to obtain the final hydroxyapatite sorbent product. The product has a mean particle size of 40±2 µm. When different screens are used, the final sorbent products obtained are specifically designated as, e.g., 20, 40, 60, and 80 µm in mean particle sizes.

The final products obtained from the present invention are highly spherical with sphericity of at least 0.95 and typically at least 0.97. The bulk density of the hydroxyapatite sorbent is in the range of about 0.5 to 0.9 g/cm$^3$, typically about 0.55 to 0.82 g/cm$^3$, and preferably about 0.62 to 0.75 g/cm$^3$.

In another aspect, the present invention provides a method of analysis or separation of organic and/or biological samples using a chromatography device or apparatus comprising a chromatographic sorbent according to any embodiments disclosed herein. The device and apparatus includes, for example, a chromatography column itself or an automated machine containing such a chromatography column as an integral component.

The organic samples analyzed or separated can be any compositions or mixtures containing a synthetic or natural organic compound. The biological samples analyzed or separated can include any compositions or mixtures comprising proteins, enzymes, nucleic acids, or the like. Use of a chromatography column to analyze or separate these samples is well known to a person skilled in the art, but the superior characteristics of the chromatography sorbent according to the present invention enables more efficient analysis and/or separation.

In the present application, when the term "about" appears in front of a value, it will be understood that the value can vary by at least ±10%, though preferably within ±5%, more preferably within ±2%. When the term "about" appears in front of a range, it will be understood that both upper limit and lower limit can vary by at least ±10%, though preferably within ±5%, more preferably with ±2%. When such a range is expressed, another aspect includes from the one particular value and/or to the other particular value. Similarly, when values are expressed as approximations, by use of the antecedent "about," it will be understood that the particular value forms another aspect.

EXAMPLES

The present invention will be described below with reference to actual examples.

Example 1. Synthesis of Nanostructured Hydroxyapatite

To prepare nanostructured hydroxyapatite, 3 kg of calcium hydroxide powder was added slowly into 30 L of water to form a calcium hydroxide suspension, with mechanical stirring to ensure that the suspension was evenly dispersed in the reaction vessel. The suspension temperature was maintained at 35° C. while stirring. Then an aqueous solution (5 L) containing 2.7 kg of phosphoric acid (85% w/w) and 0.1 kg of ammonium phosphate monobasic was added into the above suspension over a period of 16 hours, while the reaction temperature was maintained at 35° C. After the completion of addition of the above solution, the suspension was stirred continuously for additional 4 hours to obtain the nanostructured hydroxyapatite. The pH of the resultant suspension was measured to be 8.5.

To obtain a high purity hydroxyapatite product, the pH of the final suspension was controlled within the range of about 7 to 12, preferably 8 to 11. A varying amount of the aqueous solution containing phosphoric acid and ammonium phosphate monobasic was added to adjust pH of the final suspension to fall within the above range. The reaction temperature was kept constant to ensure manufacturing reproducibility.

Example 2. Preparation of Milled Hydroxyapatite

First, the hydroxyapatite primary particles obtained from Example 1 were further milled into smaller particles. A ball-mill method was applied, and zirconia beads of 0.8 mm particle size were used in the equipment.

Specifically, the hydroxyapatite suspension obtained in Example 1 was continuously pumped into a milling chamber filled with zirconium beads. The milling chamber was maintained under a high pressure. To remove the heat produced during the course of milling, circulated cold water was applied. The milled hydroxyapatite suspension was collected in a separate container. The above milling process was repeated for about 20 times to obtain the milled suspension sample.

Figure 2:
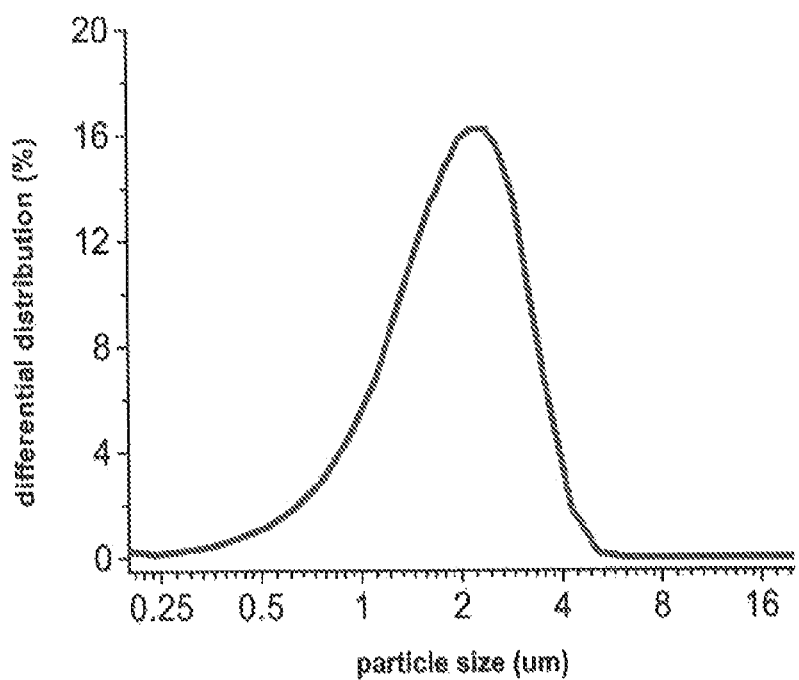
FIG. 2 shows particle size distribution curves of hydroxyapatite particles in the ball milled suspension obtained in Example 2.

The particle size distribution was measured by laser scattering diffraction. FIG. 1 shows particle size distribution curve of the un-milled hydroxyapatite suspension obtained in Example 1. FIG. 2 shows particle size distribution curve of the milled hydroxyapatite suspension obtained in Example 2. The results are shown in Table 1. After the process of ball milling, the median particle size of primary particles was reduced from 5.6 µm (D50) to 1.8 µm (D50).

By adjusting the milling cycles or applying zirconia beads with different particle sizes, the median particle size of the milled hydroxyapatite suspension was controlled to be in the range from 1 to 5 µm. The milled particle size of 1 to 3 µm enables the formation of microspheres with sufficient pore sizes as a chromatographic medium for the separation of biomolecules.

TABLE 1

Mean particle size of hydroxyapatite particles

| Sample ID | Mean particle size (µm) |
| --- | --- |
| Example 1 | 5.6 |
| Example 2 | 1.8 |

Example 3. Preparation of Spray-Dried Hydroxyapatite Powder

The highly spherical hydroxyapatite particles were obtained using spray drying method. It is desirable to form highly spherical particles which would greatly enhance the particles' mechanical strength. To achieve this object, it was found to be necessary that an appropriate amount of dispersant be added into the suspension before spray drying.

Specifically, in an experiment 7 g of sodium polyacrylate was slowly added into 35 L of hydroxyapatite suspension with vigorous stirring. The suspension gradually became less dense and more homogeneous. Its viscosity was lowered and its flowability was greatly improved.

The above suspension was then pumped into a vertical drying chamber through an atomization device equipped with revolving disk and spray nozzle, together with a hot air gas stream. The inlet temperature of air gas stream was set at 165° C. and the exiting air gas stream had a temperature of 110° C. The fine particles of hydroxyapatite were consolidated into individual aggregates of highly spherical shape inside the vertical drying chamber. The dried hydroxyapatite powder was collected at the bottom of the drying chamber.

Example 4. Production of 40 μm Hydroxyapatite Sorbent

To treat the above dried powder at a high temperature, the collected powder was placed in an oven exposed to an air flow. The oven was gradually heated from the ambient temperature to 650° C., and maintained at 650° C. for 4 hours. The powder was then slowly cooled down and removed from the oven.

The sintered powder was classified by an ultrasonic vibrating sifting method. Specifically, two screens with opening size of 35 μm and 45 μm, respectively, were installed on an ultrasonic vibrating sifter. Both screens were equipped with the ultrasonic system. The 45 μm screen was stacked right on top of the 35 μm screen. The sintered powder obtained above was placed on the top of 45 μm screen. After the sifting operation for 10 minutes, the powder between two screens was collected to obtain the final 40 μm hydroxyapatite powder product.

Comparative Example 1

The 40 μm hydroxyapatite sorbent was obtained by the same method as described in Example 4, except that the suspension obtained in example 1 was directly spray dried without undergoing the ball milling and the sintering temperatures were 475° C. and 650° C., respectively.

Comparative Example 2

The 40 μm hydroxyapatite sorbent was obtained by the same method as described in Example 4, except that the treatment temperature was 475° C.

Table 2 shows the bulk density of hydroxyapatite sorbent produced under different process conditions. As shown in Table 2, the bulk density of the sorbent obtained in Example 4 is about 30% more than that of sorbent obtained in Comparative Example 1. The increase of bulk density may improve the mechanical strength of the sorbent so as to meet the fundamental requirements for its use as a packed medium for chromatographic separation.

TABLE 2

Bulk density of hydroxyapatite sorbent

| | Bulk Density (g/cm$^3$) | | |
|---|---|---|---|
| Sample ID | Dried Sample | Sample with Sintering Temperature 475° C. | Sample with Sintering Temperature 650° C. |
| Example 4 | 0.68 | — | 0.70 |
| Comp Example 1 | 0.51 | 0.51 | 0.53 |
| Comp Example 2 | 0.68 | 0.68 | — |

Figure 3A:
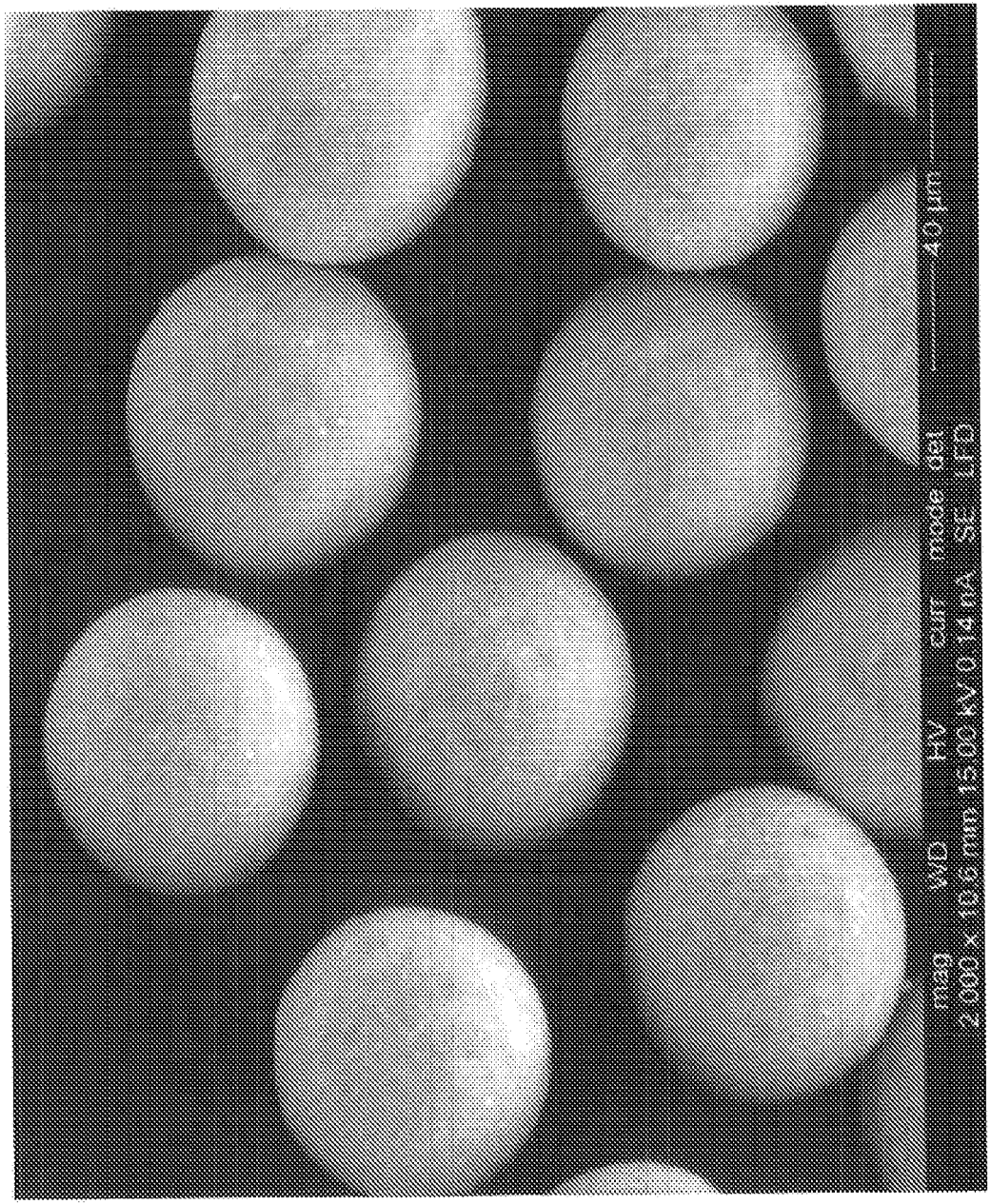
FIG. 3 shows scanning electron microscope (SEM) images of the hydroxyapatite sorbent (40 μm size) obtained in Example 4.
Figure 3B:
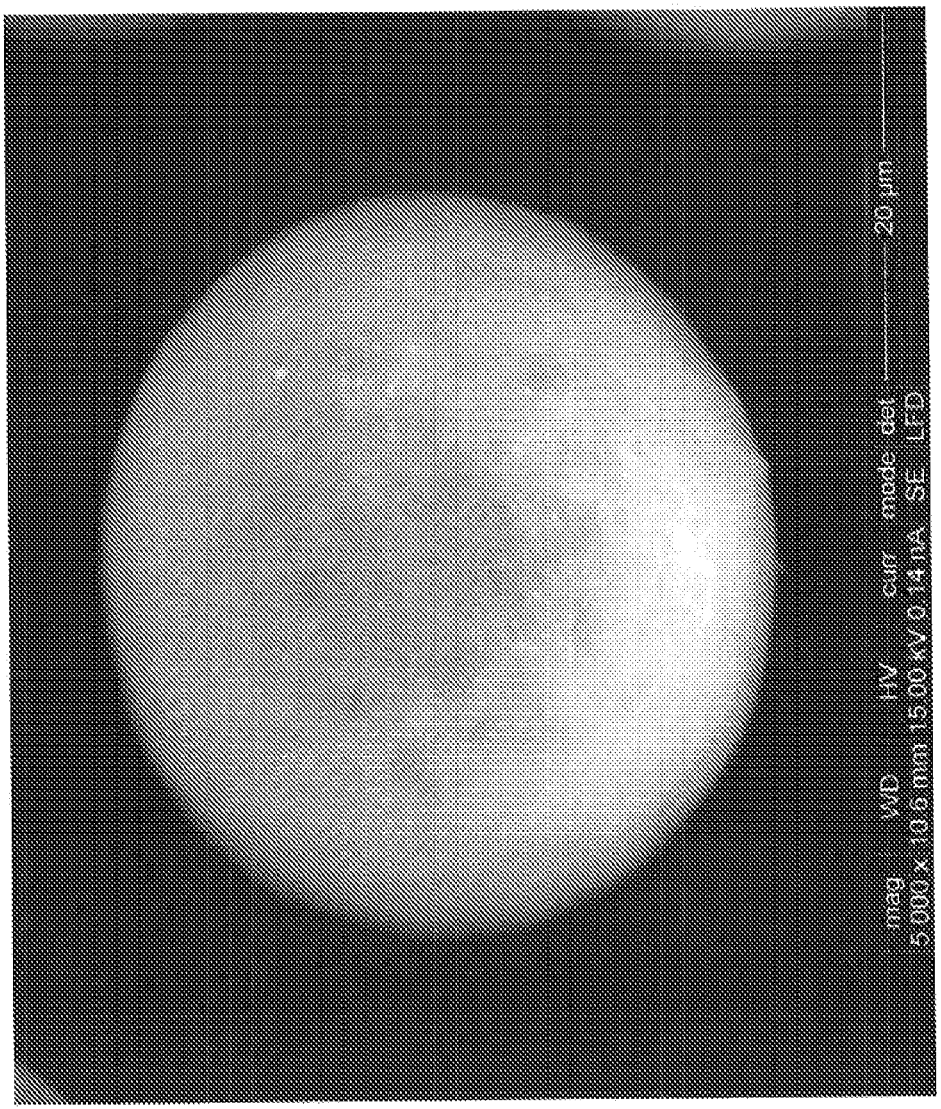
Figure 4B:
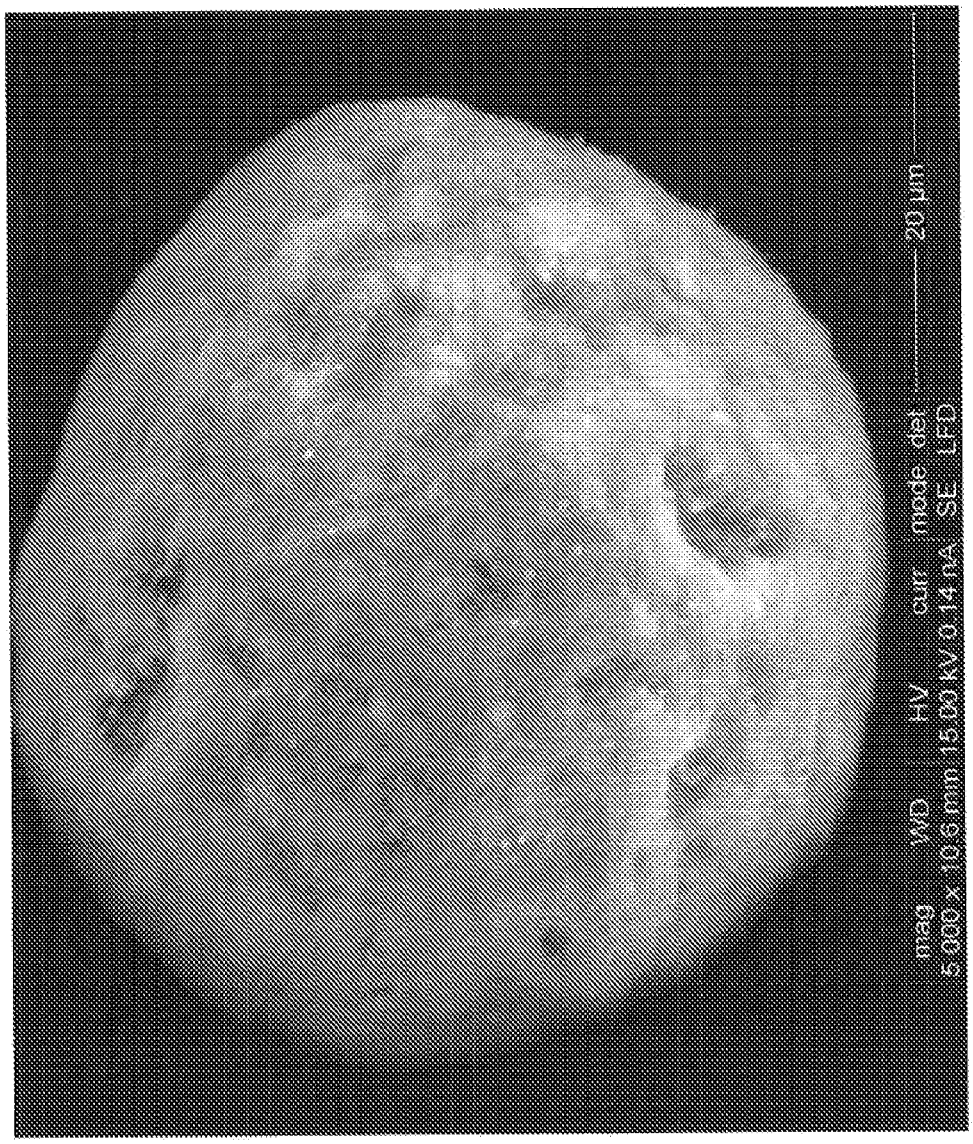
FIG. 4 shows scanning electron microscope (SEM) images of the hydroxyapatite sorbent (40 μm size) obtained in Comparative Example 1 with sintering temperature of 650° C.

FIG. 3 shows scanning electron microscope (SEM) images of hydroxyapatite sorbent (40 μm particle size) obtained in Example 4. FIG. 4 shows scanning electron microscope (SEM) images of hydroxyapatite sorbent (40 μm particle size), obtained in Comparative Example 1 with a sintering temperature of 650° C. The mean particle size was determined by laser scattering diffraction to be 40 μm within the specified range of 40±2 μm. The SEM images show that the hydroxyapatite sorbent beads obtained in Example 4 are highly spherical in shape and uniform in size, and the surface of beads is also very smooth. The sphericity of the sorbent beads was determined to be greater than 0.99. However, the sorbent beads obtained in Comparative Example 1 were barely spherical but with roughness and defects on their surface. The sorbent obtained in Example 4 was also characterized by liquid nitrogen adsorption-desorption isotherm measurement. An average pore size and a pore volume of the consolidated secondary particles were determined to be about 80 nm and 0.2 cm$^3$/g, respectively.

Figure 5:
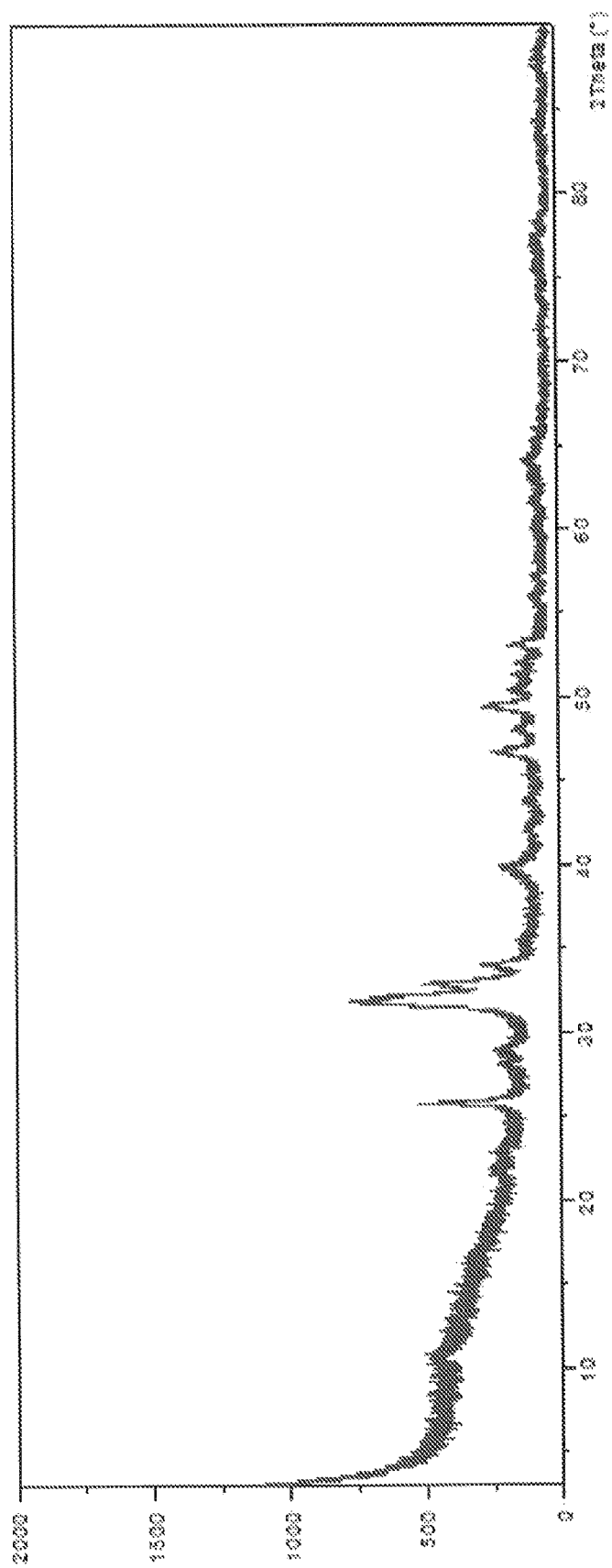
FIG. 5 illustrates an X-ray diffraction pattern (XRD) of the hydroxyapatite sorbent (40 μm size) obtained in Example 4.
Figure 6:
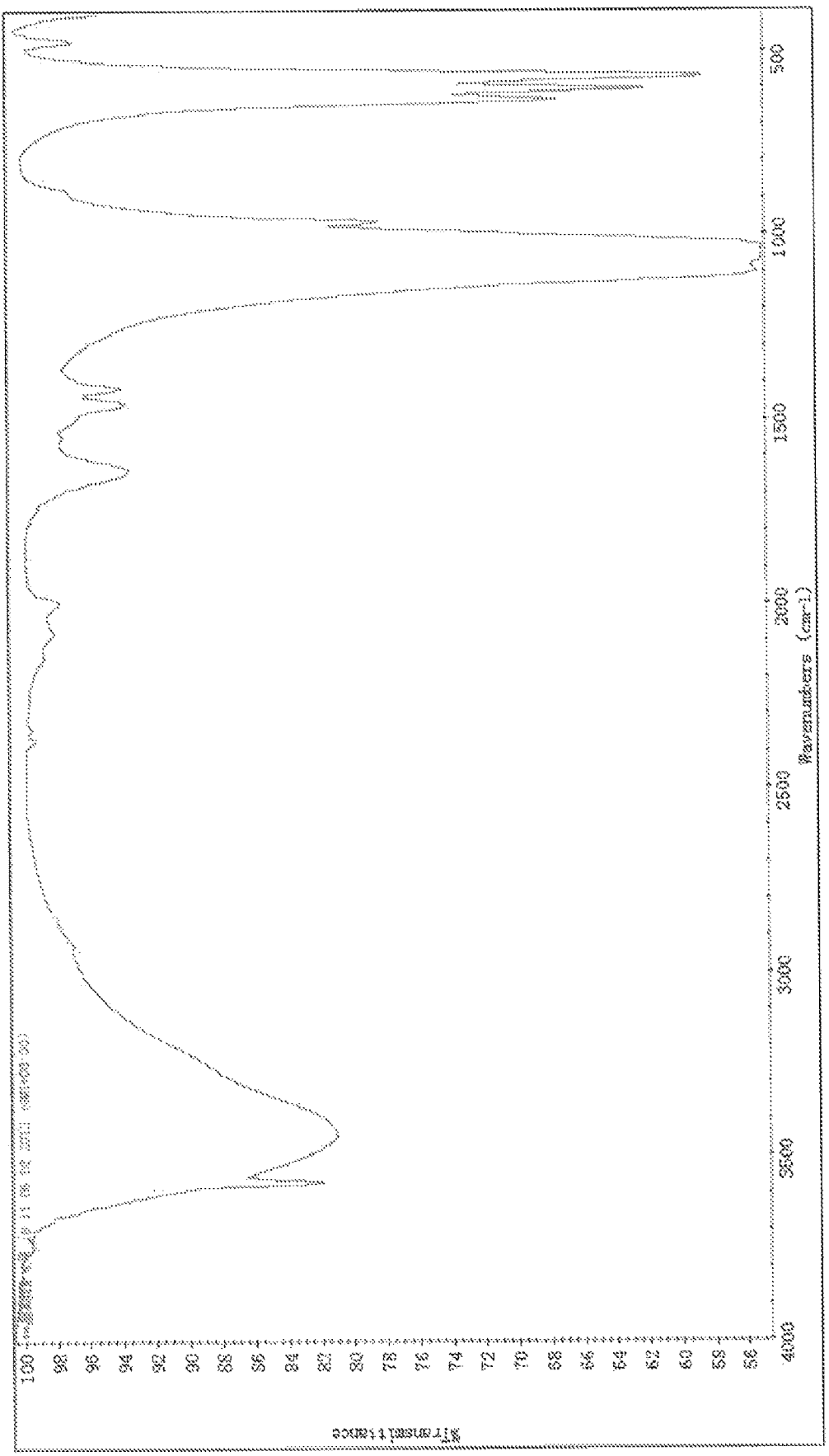
FIG. 6 illustrates an FT-IR spectrum of the hydroxyapatite sorbent (40 μm size) obtained in Example 4.

FIG. 5 shows the x-ray diffraction pattern (XRD) of the 40 μm hydroxyapatite sorbent obtained in Example 4. FIG. 6 shows the FT-IR spectrum of the 40 μm hydroxyapatite sorbent obtained in Example 4. The results of both XRD and FI-IR spectra show that the 40 μm hydroxyapatite sorbent is consistent with the structure of hydroxyapatite crystal.

Figure 7:
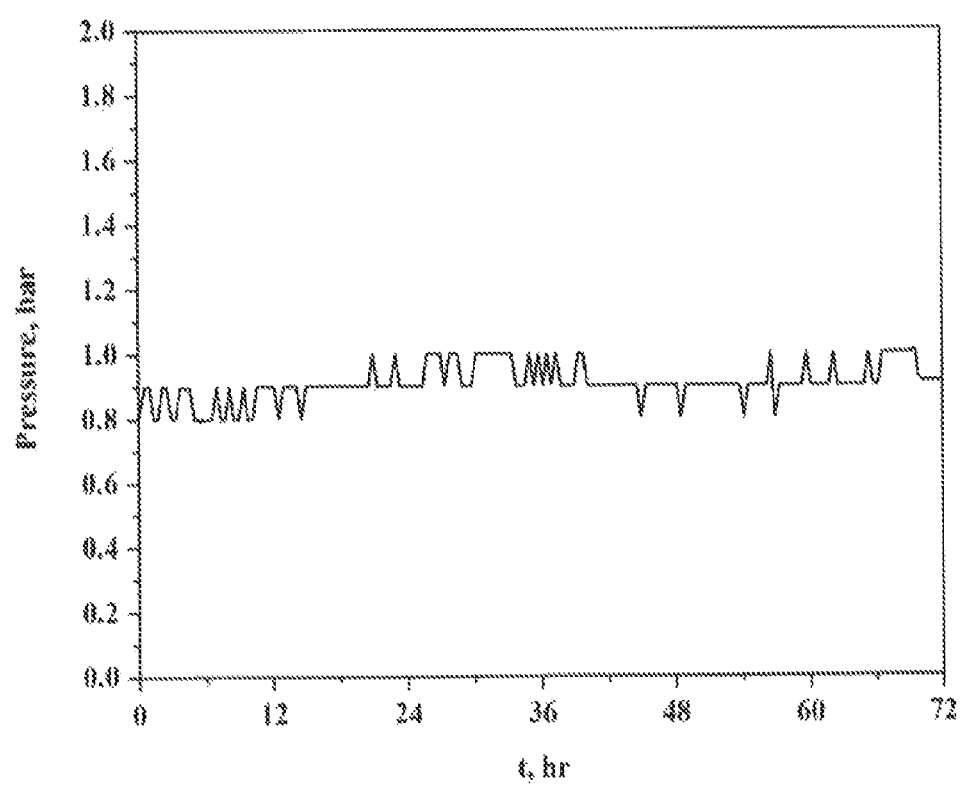
FIG. 7 illustrates chromatographic stability of the hydroxyapatite sorbent (40 μm size) obtained in Example 4.

The mechanical stability of hydroxyapatite sorbent beads was also evaluated when the sorbent was packed in an adjustable empty column. The dimension of sorbent packed in the column was 11 mm (i.d.)×200 mm (length). The packed column was installed on a GE AKTA protein purification system. The running conditions were that the mobile phase was a buffer of 5 mM sodium phosphate pH=6.5 and the flow rate was 300 cm/hour. FIG. 7 shows the curve of column pressure versus time for the sample obtained in Example 4. Hydroxyapatite was slowly dissolved under slightly acidic condition (pH<7). As a result, if the sorbent were not mechanically strong, the sorbent would tend to slowly dissolve, leading to the collapse of column bed and dramatically increasing the column pressure. FIG. 7 demonstrates that after 72 hours, the column pressure was almost the same as the initial pressure. The particles were also examined under a microscope, indicating that after 72 hours the particle shape and size were identical to those of the sorbent prior to packing and no small pieces of broken spherical particles were observed. But for the sorbent obtained in Comparative Example 1, due to the collapse of column bed, the pressure was observed to increase dramatically after 2 hours, and the evaluation test had to be stopped. The results show that the sorbent (40 μm) from Example 4 is mechanically more stable than the sample obtained in Comparative Example 1, thus meeting the requirements of sorbent for use in chromatographic separation.

Example 5. Production of 20 μm Hydroxyapatite Sorbent

The 20 μm hydroxyapatite sorbent was obtained by the same method as described in Example 4, except using two screens having opening sizes of 15 μm and 25 μm to replace the two screens having opening sizes of 35 μm and 45 μm, respectively.

Example 6. Production of 60 μm Hydroxyapatite Sorbent

The 60 μm hydroxyapatite sorbent was obtained by the same method as described in Example 4, except using two screens with opening sizes of 50 μm and 70 μm to replace the two screens having opening sizes of 35 μm and 45 μm, respectively.

Example 7. Production of 80 μm Hydroxyapatite Sorbent

The 80 μm hydroxyapatite sorbent was obtained by the same method as described in Example 4, except using two screens having opening sizes of 70 μm and 90 μm to replace the two screens having opening sizes of 35 μm and 45 μm, respectively.

Example 8. Production of 40 μm Hydroxyapatite Sorbent Using Sodium Hexametaphosphate Dispersant The 40 μm hydroxyapatite sorbent was obtained by the same method as described in Example 4, except that sodium polyacrylate was replaced with sodium hexametaphosphate, as shown in Example 3.

Specifically, 20 g of sodium hexametaphosphate dissolved in 50 mL of water was slowly added into 35 L of hydroxyapatite suspension while vigorous stirring.

Example 9. Production of 40 μm Hydroxyapatite Sorbent Using SDS Dispersant

The 40 μm hydroxyapatite sorbent was obtained by the same method as described in Example 4, except that sodium polyacrylate was replaced with SDS, as shown in Example 3.

Specifically, 5 g of SDS dissolved in 100 mL of water was slowly added into 35 L of hydroxyapatite suspension while vigorous stirring.

All sorbents obtained in Examples 5-9 had a high sphericity and similar bulk density to that the sorbent obtained in Example 4. The median particle sizes were in the range of 20±4 μm, 60±4 μm, 80±4 μm, 40±4 μm, and 40±4 μm, respectively. Their mechanical stability was also evaluated to be as good as the sorbent obtained in Example 4.

The foregoing embodiments and specific examples have been provided for illustration purpose only and are not meant to be limiting. Any one or more of the features of any one of the embodiments described above may be combined in any suitable manner with one or more features of any other embodiments described in the specification. Furthermore, many variations or equivalents of the present invention may become apparent to those skilled in the art upon review of the disclosure in the specification and in combination with general knowledge known in the field. These variations and equivalents are all within the scope of the present invention.

The invention claimed is:

1. A method of preparing hydroxyapatite of formula $Ca_{10}(PO_4)_6(OH)_2$ for use as a chromatography medium, comprising the following steps:
   (a) reacting an aqueous suspension comprising calcium hydroxide powder with an aqueous solution comprising phosphoric acid and an ammonium phosphate salt by adding the aqueous solution into the aqueous suspension while stirring to obtain a hydroxyapatite suspension comprising nanostructured primary particles of hydroxyapatite, wherein use of the aqueous solution comprising both phosphoric acid and the ammonium phosphate salt enables control of temperature through avoiding heat excursion of the reaction and forms a buffer to maintain the pH of the resultant hydroxyapatite suspension in the range of 8 to 11 in order to minimize formation of dicalcium phosphate (DCP) and tricalcium phosphate (TCP) impurities;
   (b) milling the primary particles of hydroxyapatite in the suspension;
   (c) spray-drying the suspension to obtain consolidated secondary particles of hydroxyapatite having an average pore size of about 50 to 100 nm and an average pore volume of about 0.1-0.5 $cm^3/g$; and
   (d) sintering the consolidated secondary particles to obtain sintered hydroxyapatite particles having a bulk density in the range of about 0.5 to 0.9 $g/cm^3$.

2. The method of claim 1, further comprising (e) classifying the sintered hydroxyapatite particles to obtain hydroxyapatite particles having a desired particle size range or desired median particle size.

3. The method of claim 1, further comprising addition of a dispersant into the suspension to obtain a homogenized suspension before said spray-drying.

4. The method of claim 1, wherein said ammonium phosphate salt is ammonium phosphate monobasic.

5. The method of claim 3, wherein the dispersant is an inorganic compound, a short-chain organic compound, a polymer, or a combination thereof.

6. The method of claim 5, wherein said inorganic compound is selected from phosphates, silicates and carbonates; said short-chain organic compound is selected from organic electrolytes and surfactants; and said polymer is selected from polymer electrolytes and polymer nonelectrolytes.

7. The method of claim 1, wherein said milling comprises ball milling.

8. The method of claim 1, wherein the mean particle size of the hydroxyapatite particles obtained from said milling is in the range of about 1.0 to 5.0 μm.

9. The method of claim 1, wherein the temperature used for said sintering is in the range of about 450 to 800° C.

10. The method of claim 2, wherein said classifying comprises ultrasonic sifting.

* * * * *